(12) United States Patent
Waldenborg et al.

(10) Patent No.: US 12,519,753 B2
(45) Date of Patent: Jan. 6, 2026

(54) METHOD AND SYSTEM FOR DETECTION OF RULESET MISCONFIGURATION

(71) Applicant: Sandvine Corporation, Waterloo (CA)

(72) Inventors: Anders Waldenborg, Malmo (SE);
Martin Tellgren, Malmo (SE);
Alexander Havang, Malmo (SE)

(*) Notice: Subject to any disclaimer, the term of this patent is extended or adjusted under 35 U.S.C. 154(b) by 242 days.

(21) Appl. No.: 17/994,167

(22) Filed: Nov. 25, 2022

(65) Prior Publication Data
US 2023/0171230 A1     Jun. 1, 2023

Related U.S. Application Data

(60) Provisional application No. 63/283,324, filed on Nov. 26, 2021.

(51) Int. Cl.
*H04L 9/40* (2022.01)
*H04L 43/08* (2022.01)
*H04L 47/2483* (2022.01)

(52) U.S. Cl.
CPC .......... *H04L 63/0263* (2013.01); *H04L 43/08* (2013.01); *H04L 63/0236* (2013.01); *H04L 47/2483* (2013.01)

(58) Field of Classification Search
CPC . H04L 43/08; H04L 47/2483; H04L 63/0236; H04L 63/0263
See application file for complete search history.

(56) References Cited

U.S. PATENT DOCUMENTS

| | | | |
|---|---|---|---|
| 10,375,103 B1 | 8/2019 | Brandwine | |
| 2015/0006714 A1* | 1/2015 | Jain | H04L 63/1425 709/224 |
| 2017/0374106 A1 | 12/2017 | Hamou et al. | |
| 2018/0152836 A1* | 5/2018 | Milton | H04W 12/033 |
| 2019/0260814 A1* | 8/2019 | Amini | G06V 20/52 |

OTHER PUBLICATIONS

Extended European Search Report, European Patent Office, corresponding Europe Application No. 22209589.5, dated Apr. 20, 2023.

* cited by examiner

*Primary Examiner* — Emmanuel L Moise
*Assistant Examiner* — Xiang Yu
(74) *Attorney, Agent, or Firm* — Amarok IP Inc.; Neil W. Henderson

(57) ABSTRACT

A method and system for detecting ruleset misconfiguration in a computer network. The method including: generating a set of sample data flows; evaluating each of the set of sample data flows against a predetermined definition to generate a flow descriptor for each of the set of sample data flows; evaluating each of the flow descriptors against a ruleset; and generating a summary of how each of the flow descriptors perform with respect to the ruleset. The system including: a data flow sample retrieval module configured to generate flows; a policy engine configured to store and retrieve a ruleset; a packet processing engine configured to evaluate each of the data flows against a predetermined definition to generate a flow descriptor for each flows, evaluate each of the flow descriptors against a ruleset; and generate a summary of how each of the flow descriptors perform with respect to the ruleset.

20 Claims, 6 Drawing Sheets

METHOD AND SYSTEM FOR DETECTION OF RULESET MISCONFIGURATION

RELATED APPLICATIONS

This application claims the benefit of U.S. Provisional Patent Application No. 63/283,324 filed on Nov. 26, 2021, which is hereby incorporated herein in its entirety.

FIELD

The disclosure is generally directed at processing computer network data, and more specifically, at a method and system for detection of ruleset misconfiguration.

BACKGROUND

Use of the Internet continues to grow at a rapid pace. As such, Internet data traffic continues to grow with new websites and online applications, or "apps", being introduced to networks that come alongside existing traffic with current online offerings. Internet or computer network data traffic requires processing by network components or devices within a network system in order to handle or monitor the data traffic that is being transmitted to and from devices and/or servers within the network. Different networking components, or products, within the network, will apply different policies to the data packets that are passing through these components. Examples of networking components include, but are not limited to, firewalls, load balancers, and the like. As the packets pass through the network components, the packets are processed, such as by applying or checking policies with respect to the packets.

The policies that are applied may be used to block network data from arriving at its intended destination or to re-direct the data packets. This may be problematic if the policy or policies being applied have been misconfigured or incorrectly implemented. This may result in data packets being incorrectly re-directed or terminated by these network components due to the misconfigured ruleset, or policy.

Therefore, there is a need for a method and system for detection of ruleset misconfiguration.

SUMMARY

There is provided a method of detecting ruleset misconfiguration in a computer network, the method including: generating a set of sample data flows; evaluating each of the set of sample data flows against a predetermined definition to generate a flow descriptor for each of the set of sample data flows; evaluating each of the flow descriptors against a ruleset; and generating a summary of how each of the flow descriptors perform with respect to the ruleset.

In some cases, evaluating each of the flow descriptors against a ruleset may include determining if the ruleset blocks access for at least one of the sample data flows to the predetermined definition.

In some cases, the predetermined definition may be an essential service.

In some cases, the essential service may be a predetermined server location, or predetermined IP address or predetermined service.

In some cases, the method further may further include: determining a percentage of the set of sample data flows adversely affected by the ruleset; determining if the percentage is higher than a predetermined threshold percentage; and if the percentage is higher than the predetermined threshold percentage determining the ruleset is misconfigured.

In some case, the method may further include determining a response for implementation by the computer network if ruleset misconfiguration is detected.

In some cases, the response may be to not implementing the ruleset.

In some cases, the ruleset misconfiguration may be detected if the ruleset violates an end user licensing agreement.

In some cases, generating a set of sample data flows may include: weighted sampling, wherein a weight is associated with a subscriber id and the weight is decreased when a sample is taken In some cases, generating a set of sample data flows may include: updating a pool of sample data flows at predetermined intervals.

In another aspect, there is provided a system for determining ruleset misconfiguration in a computer network the system including: a data flow sample retrieval module configured to generate a set of sample data flows; a policy engine configured to store and retrieve at least one ruleset; and a packet processing engine configured to evaluate each of the set of sample data flows against a predetermined definition to generate a flow descriptor for each of the set of sample data flows, evaluate each of the flow descriptors against a ruleset; and generate a summary of how each of the flow descriptors perform with respect to the ruleset.

In some cases, the packet processing engine when evaluating each of the flow descriptors against a ruleset may be configured to determine if the ruleset blocks access for at least one of the sample data flows to the predetermined definition.

In some cases, the packet processing engine may be configured to: determine a percentage of the set of sample data flows adversely affected by the ruleset; determine if the percentage is higher than a predetermined threshold percentage; and if the percentage is higher than the predetermined threshold percentage determine the ruleset is misconfigured.

In some cases, the packet processing engine may further be configured to determine a response for implementation by the computer network if ruleset misconfiguration is detected.

In some cases, the data flow sample retrieval module may be configured to provide for weighted sampling, wherein a weight is associated with a subscriber id and the weight is decreased when a sample is taken In some cases, the data flow sample retrieval module may be configured to update a pool of sample data flows at predetermined intervals.

Other aspects and features of the present disclosure will become apparent to those ordinarily skilled in the art upon review of the following description of specific embodiments in conjunction with the accompanying figures.

BRIEF DESCRIPTION OF DRAWINGS

Embodiments of the present disclosure will now be described, by way of example only, with reference to the attached Figures.

DETAILED DESCRIPTION

Generally, the disclosure is directed at a method and system for detection of ruleset misconfiguration in a computer network environment. In an embodiment, the disclosure includes a method and apparatus for generating a set of user samples and for comparing the set of user samples with a ruleset, such as a proposed ruleset, an existing ruleset or a new ruleset. After comparing the user samples with the ruleset, a presence or absence of ruleset misconfiguration may be determined. In an embodiment the determination may be based on how many of the user samples are blocked from accessing a predetermined server, or service, by the ruleset.

Figure 1:
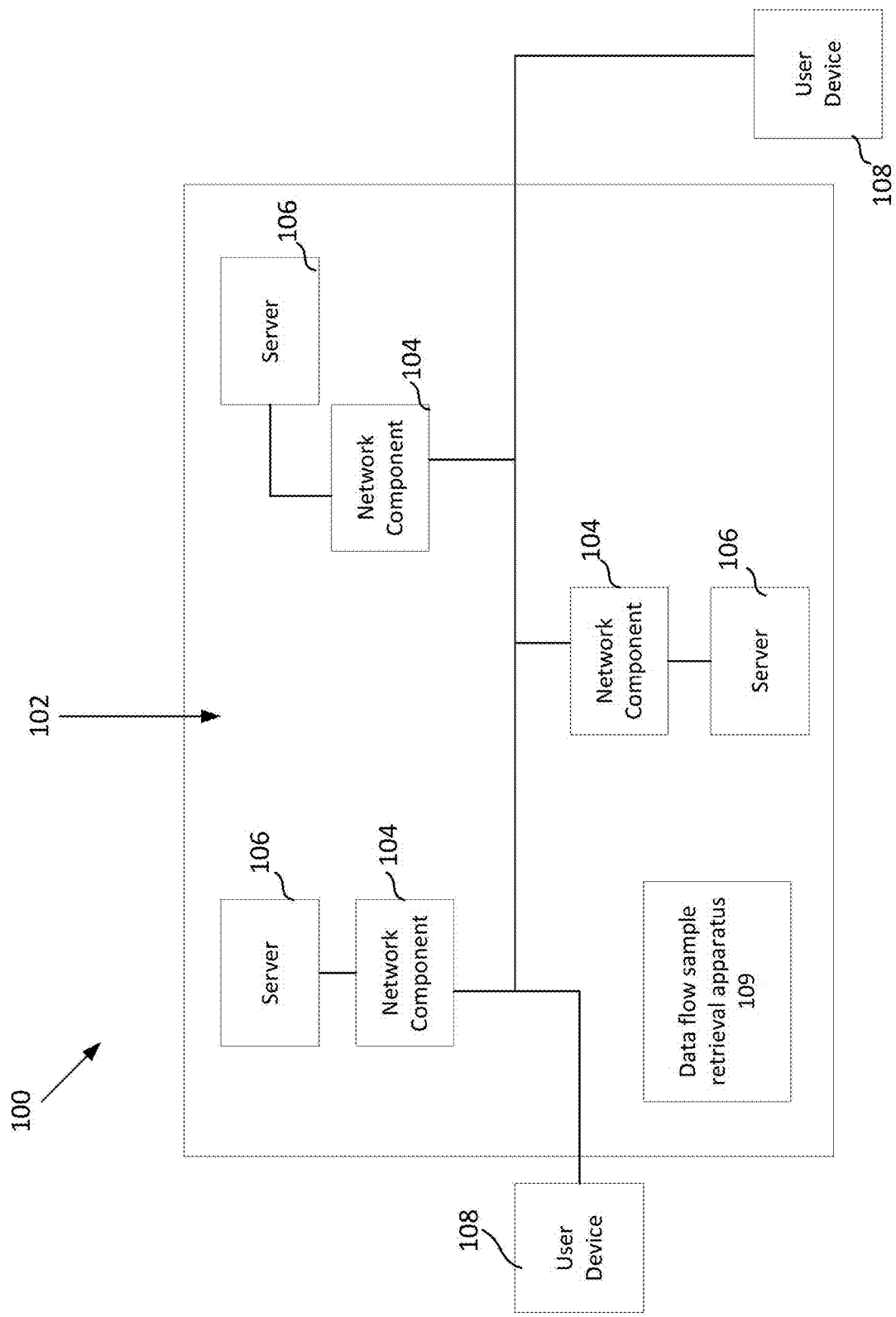
FIG. 1 is a schematic diagram of an environment of the system for detection of ruleset misconfiguration.

Turning to FIG. 1, a schematic diagram of an example environment 100 of a computer network with plurality of users. The environment 100 includes a network system 102 that includes a plurality of network components 104 associated with servers 106 that are in communication with each other, or users, via the network system 102. Although only three (3) network components and servers are shown, it is understood that the network system 102 may include any number of network components 104 and servers 106. Furthermore, although only one network component is shown with respect to each server, each server may be connected, or associated, with one or more network components. The network system 102 may further include a data flow retrieval apparatus 109 that may be used to retrieve data packets or data flows from the network as data traffic travels within the network. This may assist in generating a set of user samples, or user data flows. Users may be connected to the network system 102 via user devices 108 such as, cellular phones, tablets, laptops, televisions, Internet-of-things (IoT) devices and the like.

Figure 2:
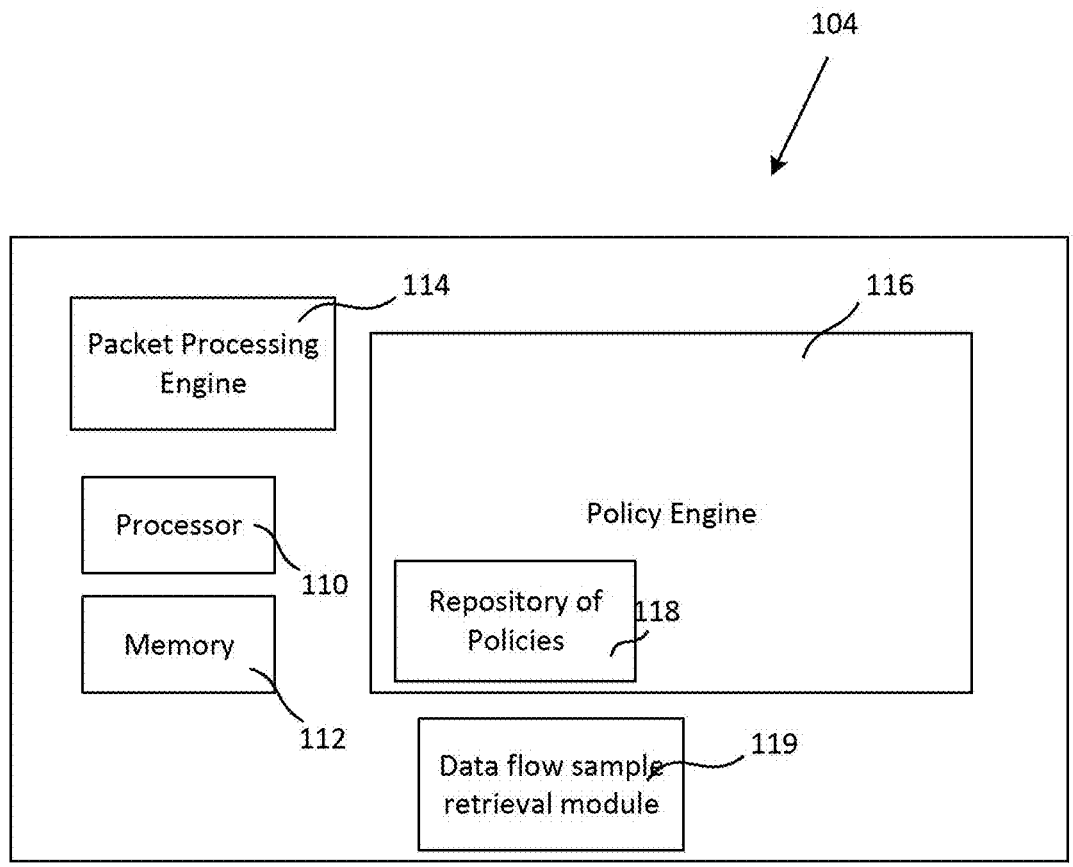
FIG. 2 is a schematic diagram of a network component housing a system for detection of ruleset misconfiguration.

Turning to FIG. 2, a schematic diagram of the system for detection of ruleset misconfiguration 104. The system, a network component 104, includes at least one processor 110, at least one memory component 112 and a packet processing engine 114. Either the processor 110 or the packet processing engine 114 (possibly via instructions from the processor 110 or independent from the processor 110) may process the data packets, or data flow, as they pass through the network component to determine if there has been a ruleset misconfiguration. The packet processing engine 114 may perform other processing of the data packets such as, but not limited to, determining the type of data packets within a data flow (collection of data packets); process data flows; collecting statistics or metrics related to the packets; forwarding the packet to a destination; dropping or delaying the packet; generating a response packet, a combination of the above or other action associated with packet processing. Although not shown, the network component 104 may also include a communication module enabling the network component to communicate with the user devices, the servers or other network components as shown in FIG. 1. Further, the processor 110 may be configured to execute instructions stored in the at least one memory component which is intended to provide the module functionality as detailed herein.

The network component 104 further includes a policy engine 116 that includes a database or other repository of policies 118 that may be applied to the data packets as they are being processed. The policy engine 116 may receive new policies from its associated server. The policy engine 116 may also receive updates to policies that are already stored within the database of policies 118. The policy engine 116 may be configured to update the database of policies to reflect the updates or to store the new policies. The network component 104 may further include a data flow sample retrieval module 119 for retrieving data packets or data flows as the data passes through the network component. These data flows may be collected as part of a set of sample data flow or user samples.

As detailed herein, an Internet data flow (sometimes referred to simply as a flow) is the transmission of data packets, or bits, over the network between devices or components of the network, or network system. Data flows are sometimes referred to as connections or data connections. As the difference between bits and packets and flows/connections are in orders of magnitude (1 billion bits per second (also known as 1 Gbps) is approximately equal to 1 million packets per second which is approximately equal to 1 thousand flows/connections per second), one aspect of optimization is to only perform a computation once per flow whenever possible. Therefore, instead of looking at each packet to determine if it is a Hypertext Transmission Protocol (HTTP) packet, once the data flow is detected by any network component in the network system as an HTTP packet, this information may be cached on the flow structure (or within data packets), meaning that subsequent data packets within the same flow/connection that pass through any network components will not have to be checked, or processed, to determine the type of data packet.

Typically, after a policy is applied to a data flow or a data packet within a data flow, the same policy usually applies to all data packets within the same flow/connection, thus the ruleset (as determined by the processor 110, or packet processing engine 114, of the system 104) that decides which policies to apply to packets may operate on flows/connections rather than each individual packets.

This type of processing may be reflected in how rules are specified for network components whereby the rules may be slightly geared towards a data flow rather than an individual data packet within the data flow. In a specific example, the ruleset in one network component may allow a set of conditions to be used to decide if a certain rule in the ruleset should match or not. These conditions may include, for example, at least one of 1) Server IP Address; 2) Client IP Address; 3) "Local" IP Address (for example, the subscriber's IP address); 4) Server port; 5) Client port; 6) IP protocol; 7) Border Gateway Protocol (BGP) Path and community of the client and server IP addresses; 8) the network interfaces the data packets in the flow/connection arrive on; 9) Differentiated Services Code Point (DSCP) fields of the packets in the flow/connection; 10) Website content categorization; 11) Multi-protocol label switching (MPLS) label information on the packets in the flow/connection; 12) Application properties extracted from the flow/connection (for example, user-agent, hostname, filename from HTTP); 13) Application name inferred from data in flow/connection; 14) Subscriber information provisioned from control plane; and 15) Geographical information from the external peer's IP address. Other conditions may also be used in a ruleset.

For each of these conditions, it is either at least one criterion that is used to find the flow/connection when providing connection tracking (for example: server IP, client IP, server port, client port, IP protocol otherwise known as the 5-tuple or the like) or it is an attribute that can be stored and/or cached on the flow or connection. A flow in this context can be considered the combination of a flow from the client to the server and the flow from the server to the client. A connection is also to be considered the combination of source and destination flows. In some cases, the Packet Processing Engine may use the 5-tuple information to determine which connection/flow is associated with the packet.

In an embodiment, implementation of the system and method are configured to assist in solving the problem of detecting an incorrect configuration, an inappropriate configuration, or a misconfiguration, of a ruleset in network equipment, such as a network component. The ruleset may be seen as specific rules that are used by the network component to implement or apply the policies that are stored within the policy engine. In some cases, misconfiguration of a ruleset can cause a large percentage of users to be unable to reach an essential service or services, server or servers within the network. These incorrect ruleset configurations may occur, via, for example, operator mistake or otherwise. In some cases, these configurations can result in one or more rulesets that are not allowed by, for example, network component, equipment, vendor, or the like. With a ruleset possibly including thousands of individual rules, it may be very difficult for an operator, user, or the like, making a small change to one rule to know how that small change may affect interaction of the changed rule with all the other rules in the ruleset.

For instance, in an enterprise setting, it may be desirable to ensure that employees can reach services, and/or servers, the employees need to do their job. If a small change to a rule affects rules related to this scenario or causes a ruleset misconfiguration that stops an employee from accessing a service or server, this may affect an employee's ability to do their job. A similar problem, or issue, may arise for a network equipment vendor to detect/reduce/prevent product misuse (which may also be a violation of an agreement, such as, but not limited to, an end-user license agreement (EULA)) if a network component is unable to perform mass blocking.

In processing data flows, it is noted that for each of the attributes on a flow is either related to a server or to a client (seen as one of the user devices). It will be understood that a criterion is a restriction on an attribute, for example, a detected application name would be considered to be an attribute of a connection or flow. The determination that the detected application name IS or MUST BE Netflix could be considered a criterion of a ruleset.

In understanding the embodiments of the system and method detailed herein, in some scenarios, for some of the attributes within data packets in a flow, the attributes will be same/similar regardless of which server/service the user is using or accessing, while in other scenarios, the attributes for data packets in a flow will be same/similar for a server/service provided by the server regardless of which user is accessing that server/service.

Generally, a flow, represented as F, has one or more attributes, represented by Ax, whereby the flow has, or is associated with, a server, represented as S(F), and a user, or client, represented as U(F). Therefore, $$\forall x: \forall j,i: (S(F_i)=S(F_j) \Rightarrow A_x(F_i)=A_x(F_j)) \vee (C(F_i)=C(F_j) \Rightarrow A_x(F_i)=A_x(F_j))$$

In other words, flows directed towards the same server would have the same value for their associated attributes as would flows directed from the same user. A ruleset is intended to review all attributes of the flows or connections that are considered by the rule. This will evaluate the ruleset based on the flaws associated with the ruleset.

Figure 3:
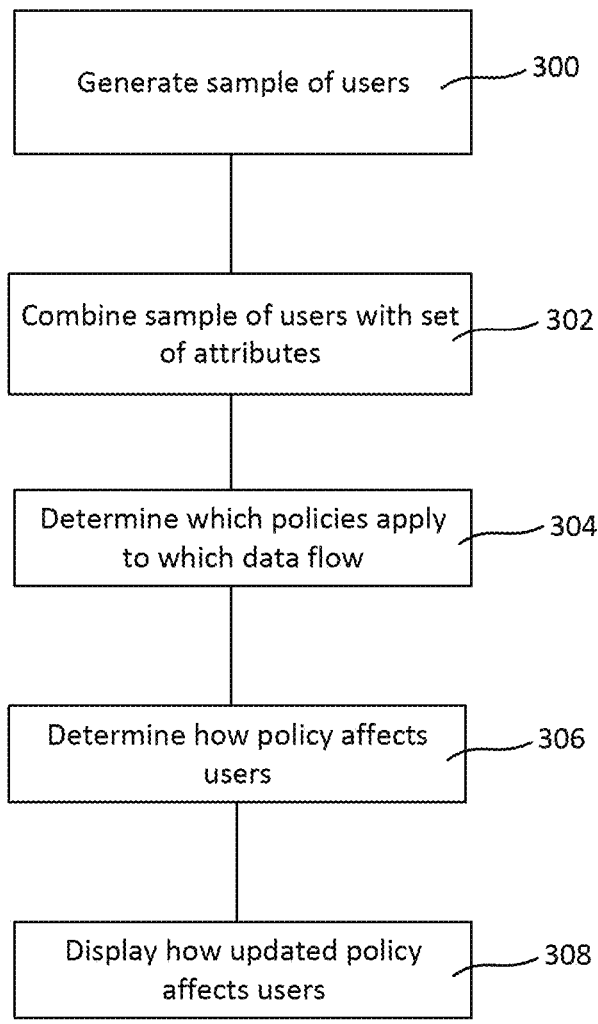
FIG. 3 is a flowchart of method of detecting ruleset misconfiguration in a network system.

Turning to FIG. 3, a flowchart of a method of detecting ruleset misconfiguration according to an embodiment is shown. By sampling the user side attributes from a real-time data flow on the network system, or systems, a representation, or sample, of the users, or user data flow may be formed or generated, at 300. The samples are intended to have the user side attributes reviewed. In some cases, the samples may be reviewed individually, and each sample will have the user side attribute stored and combined with a predefined server side attribute. After the user side and server side attributes are combined, each entry is intended to have a complete set of attributes. The sample of users may then be combined with a definition of server/service side attributes, at 302.

In a specific example, if an operator wanted to verify the behavior of flows accessing YouTube, the operator may create an essential service definition that included the values of the server side attributes that a YouTube connection is expected to have.

When the definition is combined with a sampled data flow, the result is intended to represent or resemble how the sampled data flow would appear if it was connected to the server/service in the definition. These constructed flows can then be passed to the ruleset to determine which policies would be applied to each sampled data flow, at 304. By combining each sample data flow with the server/service attributes, an approximation of how the policies affects the whole population (based on how the policies affected the sample data flows) may be determined, at 306. The approximation may be displayed, at 308, to, for example, the operator of the system. In some cases, the system may automatically take action based on a misconfiguration check, by for example, refusing to deploy a new ruleset into production.

Some advantages of method and system detailed herein are intended to include, enabling the system to check for changes in policy ruleset behavior before activating the updated rules with respect to users, or data flows. Results of this check may allow users, or the system, to visualize a difference between the previous ruleset and the updated ruleset, display a summary of the resulting comparison or checking, reject or not allow installation or update of a new ruleset or policy and/or enable testing of how the updated ruleset may affect the user population with respect to specific server/services. These server/services may, in one embodiment, be interactively defined services. Another advantage of is that the system may also detect violations of agreements, such as blocking-related EULA violations.

In a specific embodiment of the system, it is assumed that a flow (sometimes referred to as a connection) has at least the following attributes: (S) ServerIP; (S) ServerPort; (S) IP protocol; (U) ClientIP; (U) ClientPort; (S) Detected Application; and (S) Hostname where (S) denotes that it is an attribute that is server/service invariant (where it is the same value regardless of which user connects) and (U) denotes that is an attribute that is user invariant (where the same value could be used regardless of which server/service the user connects to). In an embodiment of a method for the detection of the ruleset may include two separate concurrent processes, which may be seen as a user sample collection process and an evaluation process, or they may be combined into a single process. It will be understood that a system employed in the network is likely to have more attributes available to be used as criteria in the ruleset. In some cases, attributes to be used as criteria may include, additional subscriber information, for example subscription type, location, and the like, link level information, application extracted attributes, user and server operating system and the like. Operators may choose to use more or less attributes for each of the at least one criterion depending on the ruleset and the information available from the flows.

The User Sample Collection process is intended to run continuously to form or generate a pool or set of user samples representing the users passing data traffic through the network system. The Evaluation process is run or executed at any time to check a ruleset against previously defined essential services or attributes and a pool, or representation, of user samples that are generated by the user sample collection process. An essential service is intended to consist of values for server side attributes of one of the services for which the system reviews a ruleset. In some cases, these essential services may be defined by an operator ahead of being reviewed. In other cases, they may be defined interactively as a way to investigate a ruleset (or the behavior of a ruleset) and/or the difference in behavior between two rulesets. Further, in some other cases, they may be essential services as defined by the system vendor to detect end user licensing agreement (EULA) violations.

Figure 4:
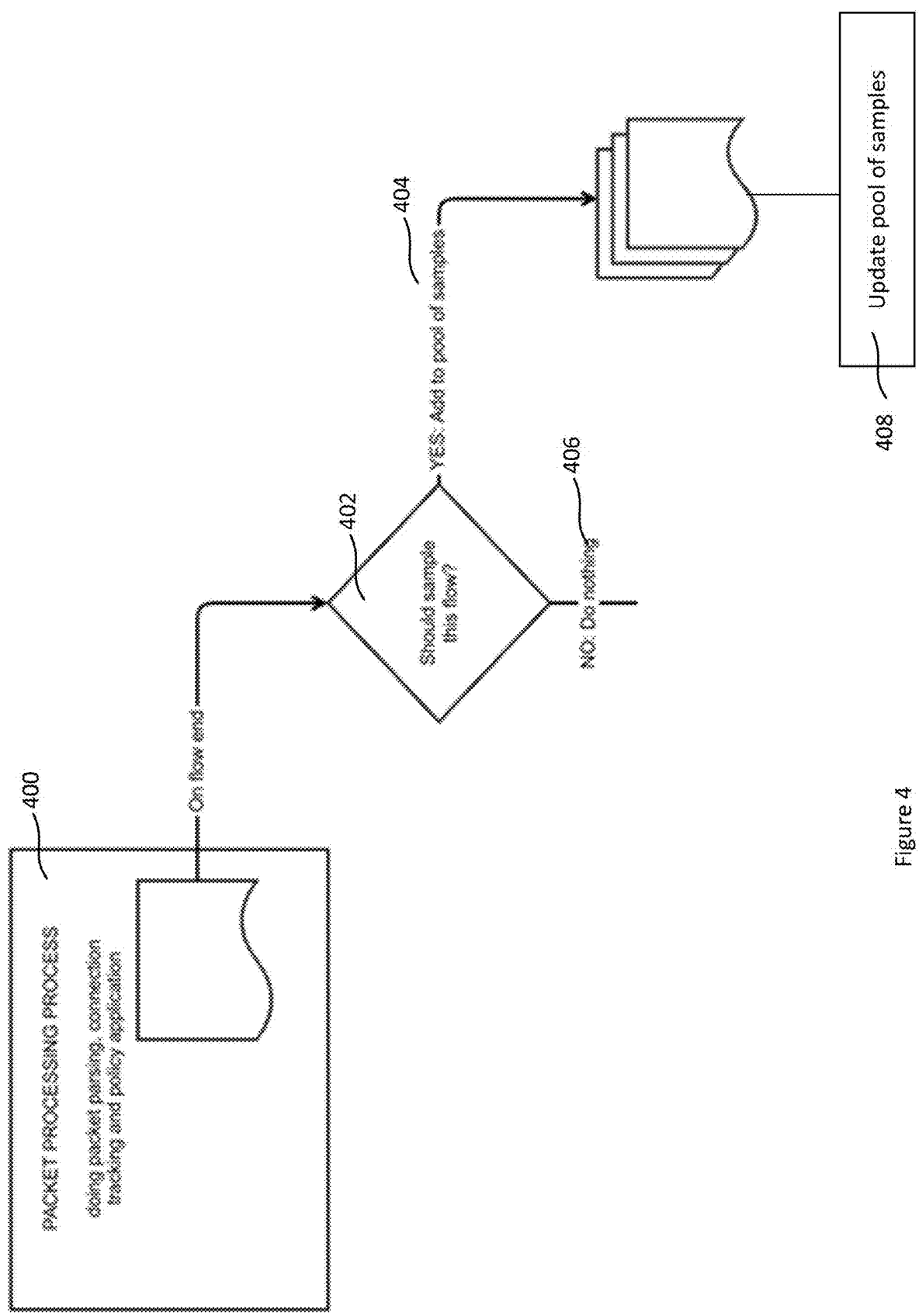
FIG. 4 is a flowchart of a method of collecting user samples.

Turning to FIG. 4, a flowchart showing an example of a method of user sample collection is provided. As discussed above, the user sample collection process runs continuously and forms or generates a pool, or representation, of samples, sampled data flow or data flows associated with specific users.

Figure 5:
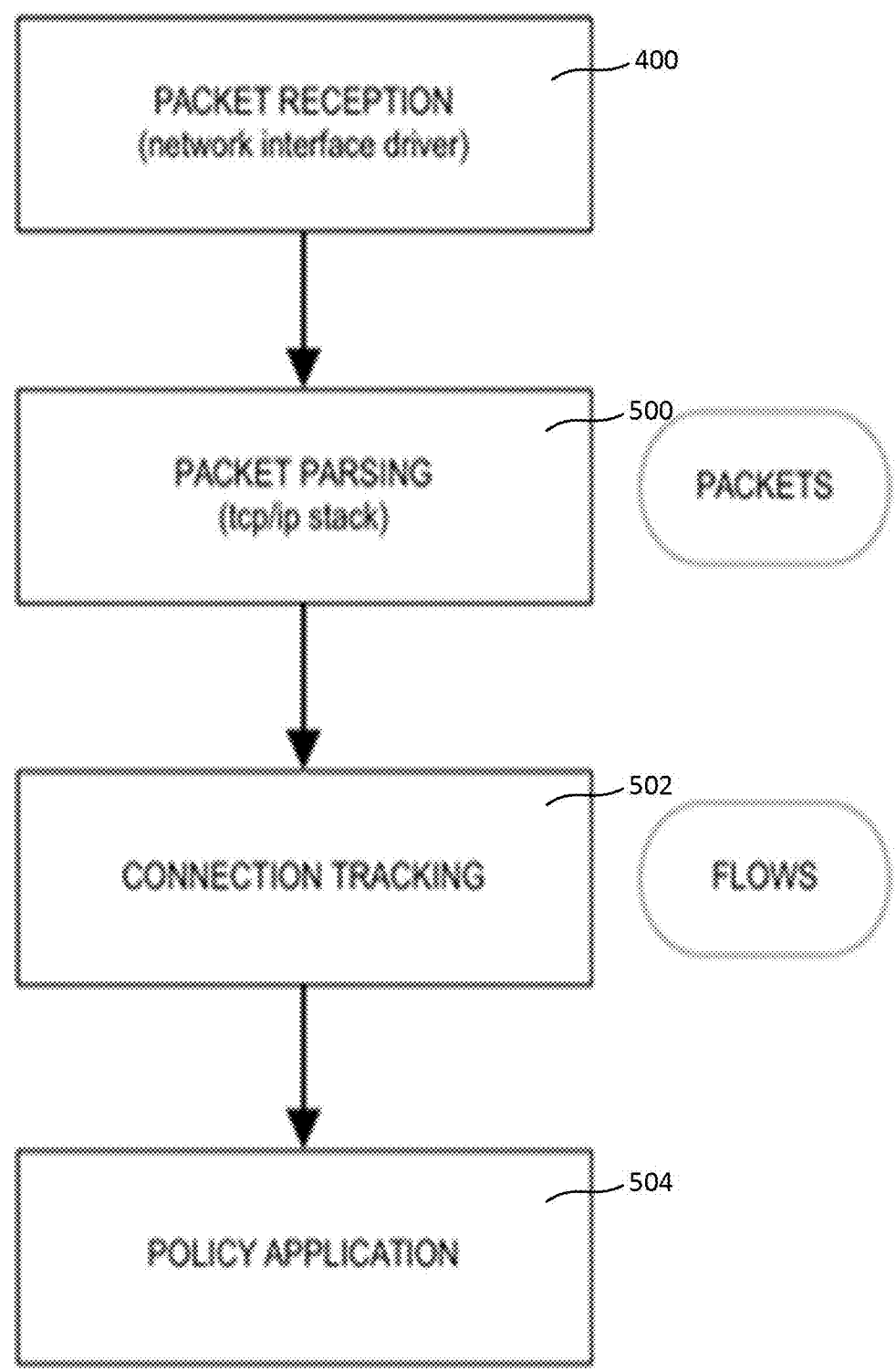
FIG. 5 is a flowchart of packet processing actions.

As a data flow passes through a network component, packet processing is performed on the data flow, at 400. In this packet processing process, tasks such as, but not limited to packet parsing (500), connection tracking (502) and/or policy application (504) (shown in FIG. 5) may be performed by the processor or the packet processing engine. It will be understood that a ruleset being reviewed will be reviewed at a flow/connection level. In particular, packet parsing (500) may be done to extract information from the packet to determine the flow associated with the packet, sometimes referred to as connection tracking. It is intended that the attributes of the packet may not be gathered at each individual packet but may instead be gathered at the flow level.

Packet parsing includes the parsing of individual data packets within the data flow while the connection tracking includes the parsing of data flows. Returning to FIG. 4, after packet processing, a check is performed to determine if the flow should be further sampled, at 402. If it is determined that the flow should be sampled, the data flow is added to a pool of samples, at 404. If it is determined that the flow does not have to be sampled, nothing further is done, at 406 and the flow continues to its destination.

In some embodiments, the pool of samples may include a replacement policy so that there may be a limit to the number of samples in the pool, or set, of samples such that the pool of samples may be updated, at 408, if desired. For instance, a last recently used (LRU) policy may be applied to the pool of samples to limit the size of the pool of samples. Alternatively, reservoir sampling may be used to select a random sample to be replaced. In other embodiments, the replacement methodology may depend on the set-up of the pool of samples. The sample size of a pool may depend on how many users' traffic the system processes and how much variance there is in the users' attributes. The more users and the higher variance in their attributes the more samples may be used to form a more accurate representation. It will be understood that there will be a tradeoff between accuracy and processing and memory cost.

In other words, for each data flow, or connection, seen by the system (or network component within the system), a sample can be taken. In one embodiment, once a data flow has been sampled, a broadcast message or an indication on the data flow may be generated to indicate that the data flow has already been processed. When this sample is taken does not matter, it can be taken by any network component within the system at any point in time the data flow is flowing within the network, if the user side attributes are available. The sample may be taken at the start of the data flow (where a user or server transmits an initial data packet) or at the end of the flow (when the data packet is nearing its intended destination). However, it will be understood that later packets in the same flow may have more context collect form the previous packets of the same flow and may provide more information based on the previous data collected.

Furthermore, how the data flow samples are taken, or selected, can be varied where the flows may be taken purely by random chance or may be more advanced to avoid bias towards users with many data flows. In some cases, weighted sampling may be used wherein a weight is associated with a subscriber id and the weight may be decreased when a sample is taken. Other alternatives may also be possible.

With respect to the pool of samples gathering, in some embodiments, the samples may be taken directly from, or by, the system analyzing the packets or data flow such as via the data flow sample retrieval module 119. Alternatively, an external system (or the data flow sample retrieval apparatus 109) may be used to obtain, or gather, the data packets (or data flows). One example of a data flow sample retrieval apparatus 109 is an Internet Protocol Flow Information Export (IPFIX) apparatus or module. Other methods may be used to determine flow records between components in the alternative to an IPFIX apparatus or module.

With the evaluation process, this method evaluates the pool of samples based on defined attributes, or defined server/services. For instance, the system may be provided with a policy ruleset to check along with a definition of an essential service. The definition of essential service may be a predetermined server location, or predetermined IP address, predetermined service or the like.

In one embodiment, given the policy ruleset to check and the definition of essential service, a method of evaluation for use in detecting ruleset misconfiguration may be performed. One example of a definition of essential service may include server/service invariant properties, such as, but not limited to, a Server IP (ServerIP) address, a server port (ServerPort) number, an IP protocol, a detected application, and a Hostname. For instance, one specific definition of essential service may be ServerIP=203.0.113.84; ServerPort=443; IP protocol=TCP; Detected Application=HTTP over TLS; and Hostname=example.com.

Figure 6:
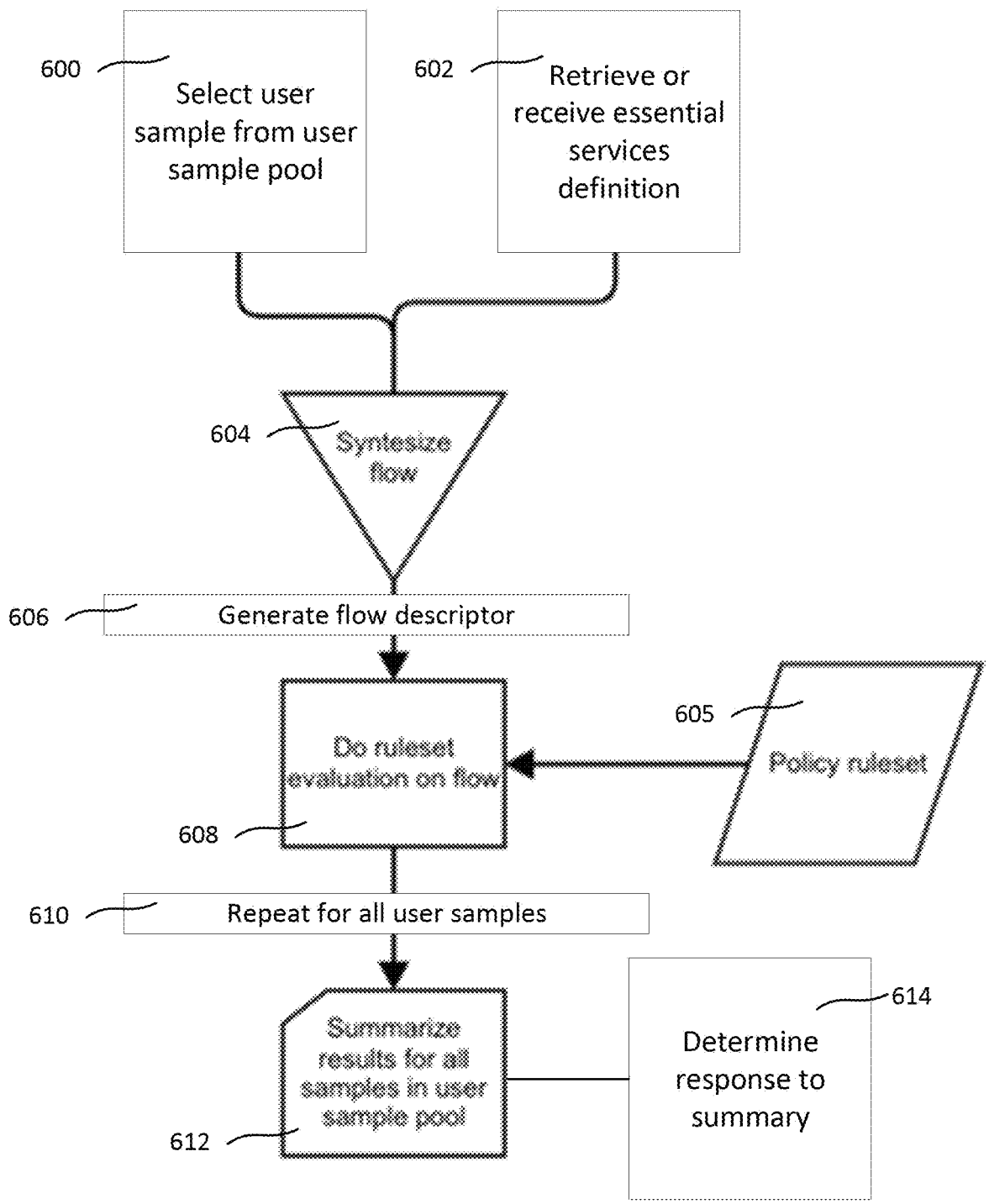
FIG. 6 is a flowchart outlining a method of determining ruleset misconfiguration.

Turning to FIG. 6, a flowchart of a method of evaluation for use in detecting ruleset misconfiguration is shown. Initially, one of the samples from the pool of samples is selected at 600. This sample may be combined, or integrated, with the essential service definition that is retrieved or received by the system, at 602. The sample, or sample data flow, and the essential service definition are then combined and synthesized to an updated data flow, at 604. At 606, a flow descriptor is generated which is configured to include the data flow attributes. Each flow descriptor is intended to include the set of attributes. Each attribute may be either a user side or server side attribute. The user side attributes are determined from the sample or the flow while the server side attributes may be determined or defined in the essential service definitions.

The flow descriptor may then be processed with respect to a policy ruleset (shown as 605), such as a proposed, or updated, or selected ruleset, at 608. In one embodiment, the flow descriptor is evaluated against the proposed, or updated, or selected ruleset. In one embodiment, the evaluation may determine if the user or users (associated with the individual samples in the pool of samples) have access to the essential service or if the ruleset is blocking the user from accessing the essential service.

In one embodiment, at 610, the evaluation may be performed for each of the samples in the pool of samples. Once the evaluations are complete, the results may then be summarized, at 612. This summary can then be presented, or displayed, to an operator or compared to other ruleset or rulesets, compared with previous ruleset evaluations and the like. By doing this on all samples in the user sample pool, an estimate with respect to how a ruleset affects the user population's access to that essential service can be determined.

A determination of how to respond to the summary may then be determined or executed, at 614. In an embodiment, this may be determined by the system based on the results or the response to the results may be received from user input and then executed by the network component, or system.

For example, in an embodiment, if a predetermined threshold percentage of users (samples or data flows) in the pool of samples show that they are being restricted or blocked from the essential service, the rule that is causing this restriction or block may be disabled by the system in order to allow dedicated users access to the essential service. The system may determine access is preferable rather than allowing the transmission to be blocked due to the ruleset misconfiguration. Alternatively, if it is determined that there is a threshold percentage or number of users (defined by sample flows) that are unable to access an essential service, the network system may disable the ruleset since it may be determined that there is a ruleset misconfiguration.

In another example, as shown in pseudo-code below, the evaluation may be performed as outlined below.

| Pseudo code |
| --- |
| ```
sample_taking_process(flow-atributes) {
    if (random0to1( ) < RAND_THERESHOLD) {
        samplepool.add(flow-attributes[ClientIP,
            flow-attributes[ClientPort],
            flow-attributes[... all other user invariant attributes ...]);
    }
}
evaluation_process(ruleset, interesting-service-definition) {
    summary = { }
    foreach (sample in samplepool) {
        constructed-flow = {
            ServerIP = interesting-service-definition[ServerIP]
            ServerPort = interesting-service-definition[ServerPort]
            IP Protocol = interesting-service-definition[IPProtocol]
            ClientIP = sample[ClientIP]
            ClientPort = sample[ClienPort]
            Detected Application = interesting-service-definition[Detected Application]
            Hostname = interesting-service-definition[Hostname]
        }
        resulting-policy = policy_ruleset_evaluation(ruleset, constructed-flow)
        summary{resulting-policy} += 1
    }
    print(summary[ALLOW]/samplepool.size, " percent of users allowed")
    print(summary[DENY]/samplepool.size, " percent of users denied")
}
``` |

In this pseudo-code example, the policy_ruleset_evaluation function may implemented as a simplified ruleset evaluation or module that can return ALLOW or DENY. Therefore, if the number of DENY responses is higher than the predetermined threshold percentage, for example 1%, 5%, 10%, 20% or the like, it may be determined that there is a ruleset misconfiguration. Also, the policy_ruleset_evaluation function may be seen as a real function that is used to evaluate the data flows (or one that is semantically equivalent for the parts that are relevant to the evaluation). As discussed above, the evaluation may be performed a plurality of times to assess the outcome of how a ruleset may affect access to different essential services.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or nonvolatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of detecting ruleset misconfiguration in a computer network, the method comprising:
    generating a set of sample data flows, wherein each sample data flow has user side attributes from a real time data flow, wherein the user attributes comprise client IP and client port;
    combining each sample data flow with predefined server side attributes, wherein the service side attributes comprise server IP, server port, server IP protocol and detected application;
    evaluating each of the sample data flows of the set against a predetermined definition to generate a flow descriptor for each of sample data flows, based on the user side and server side attributes;
    evaluating each of the flow descriptors against a ruleset to detect an incorrect configuration; and
    generating a summary of how each of the flow descriptors perform with respect to the ruleset, wherein the summary comprises user samples blocked from accessing a predetermined server or service.

2. The method of claim 1, wherein evaluating each of the flow descriptors against a ruleset comprises:
    determining if the ruleset blocks access for at least one of the sample data flows to the predetermined definition.

3. The method of claim 2, wherein the predetermined definition is an essential service.

4. The method of claim 3, wherein the essential service is a predetermined server location, or predetermined IP address or predetermined service.

5. The method of claim 2, further comprising:
    determining a percentage of the set of sample data flows adversely affected by the ruleset;
    determining if the percentage is higher than a predetermined threshold percentage; and
    if the percentage is higher than the predetermined threshold percentage determining the ruleset is misconfigured.

6. The method of claim 1, further comprising:
    determining a response for implementation by the computer network if ruleset misconfiguration is detected.

7. The method of claim 6, wherein the response is not implementing the ruleset.

8. The method of claim 6, wherein a ruleset misconfiguration is detected if the ruleset violates an end user licensing agreement.

9. The method of claim 1, wherein generating a set of sample data flows comprises:
    weighted sampling, wherein a weight is associated with a subscriber id and the weight is decreased when a sample is taken.

10. The method of claim 1, wherein generating a set of sample data flows comprises: updating a pool of sample data flows within the set of sample data flows at predetermined intervals.

11. A system for determining ruleset misconfiguration in a computer network, the system comprising at least one processor configured to execute instructions stored in a memory component wherein the instructions provide for modules, comprising:
    a data flow sample retrieval module configured to generate a set of sample data flows, wherein each sample data flow has user side attributes from a real time data flow, wherein the user attributes comprise client IP and client port, and combine each sample data flow with predefined server side attributes, based on the user side and server side attributes;
    a policy engine configured to store and retrieve at least one ruleset and to detect an incorrect configuration; and
    a packet processing engine configured to evaluate each of the sample data flows of the set against a predetermined definition to generate a flow descriptor for each of the sample data flows of the set, evaluate each of the flow descriptors against the at least one ruleset; and generate a summary of how each of the flow descriptors perform with respect to the at least one ruleset, wherein the summary comprises user samples blocked from accessing a predetermined server or service.

12. The system of claim 11, wherein the packet processing engine when evaluating each of the flow descriptors against a ruleset is configured to determine if the ruleset blocks access for at least one of the sample data flows to the predetermined definition.

13. The system of claim 12, wherein the predetermined definition is an essential service.

14. The system of claim 13, wherein the essential service is a predetermined server location, or predetermined IP address or predetermined service.

15. The system of claim 12, wherein the packet processing engine is configured to:
    determine a percentage of the set of sample data flows adversely affected by the ruleset;
    determine if the percentage is higher than a predetermined threshold percentage; and
    if the percentage is higher than the predetermined threshold percentage determine the ruleset is misconfigured.

16. The system of claim 11, further wherein the packet processing engine is further configured to determine a response for implementation by the computer network if ruleset misconfiguration is detected.

17. The system of claim 16, wherein the response is not implementing the ruleset.

18. The system of claim 16, wherein a ruleset misconfiguration is detected if the ruleset violates an end user licensing agreement.

19. The system of claim 11, wherein the data flow sample retrieval module is configured to provide for weighted sampling, wherein a weight is associated with a subscriber id and the weight is decreased when a sample is taken.

20. The system of claim 11, wherein the data flow sample retrieval module is configured to update a pool of sample data flows within the set of sample data flows at predetermined intervals.

\* \* \* \* \*